J. Shaw.

Metals.

No. 4,030. Reissued Jun. 14, 1870.

Witnesses.
G. W. Coombs
Henry Morris

Inventor.
J. Shaw
per Munn & Co.
Attorneys

N. PETERS, PHOTO-LITHOGRAPHER, WASHINGTON, D. C.

UNITED STATES PATENT OFFICE.

JEHYLEMAN SHAW, OF BRIDGEPORT, CONNECTICUT.

IMPROVEMENT IN RECOVERING GOLD AND SILVER FROM WASTE SOLUTIONS.

Specification forming part of Letters Patent No. 35,842, dated July 8, 1862; Reissue No. 1,651, dated April 5, 1864; Reissue No. 3,506, dated June 15, 1869; Reissue No. 4,030, dated June 14, 1870.

*To all whom it may concern:*

Whereas JEHYLEMAN SHAW, of Bridgeport, Fairfield county, and State of Connecticut, did invent a new and useful Mode and Operation for Recovering Gold, Silver, &c., from Waste Solutions, for which Letters Patent of the United States were granted July 8, 1862, and reissued April 5, 1864, No. 1,651; and whereas said reissued patent was, by said SHAW, assigned to THE SHAW & WILCOX COMPANY, of Bridgeport aforesaid, and by them surrendered, and a new reissue taken therefor, No. 3,506; and whereas said reissued patent was, by a proper instrument in writing, duly recorded in the Patent Office of the United States, transferred and assigned, by said SHAW & WILCOX COMPANY, with all their right, title, and interest therein, to the said JEHYLEMAN SHAW, on the 20th day of July, 1869, recorded 4th September, 1869:

Now, therefore, the said JEHYLEMAN SHAW does hereby declare that the following is a full, clear, and exact description thereof, which will enable others skilled in the art to make and use the same, reference being had to the accompanying drawing, forming part of this specification.

Figure 1:
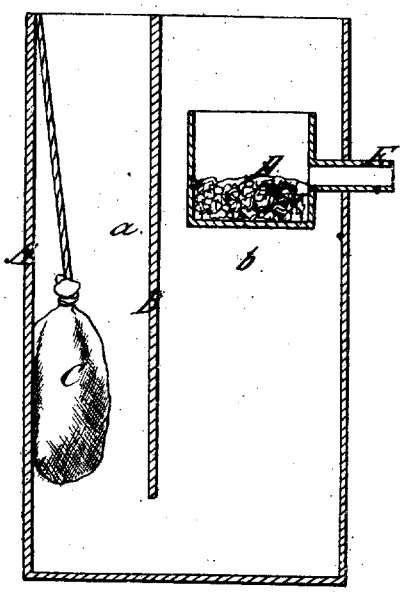
Figure 2:
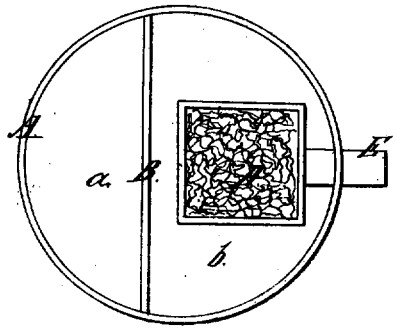

Figure 1 represents a vertical central section of the improved apparatus for recovering gold, silver, &c., from waste solutions. Fig. 2 is a plan or top view of the same.

Similar letters of reference indicate corresponding parts.

This invention consists in the method, as hereinafter described, of recovering from the waste metallic solutions used by photographers and others the gold, silver, or other valuable metal contained therein after the solution has been used and spent.

A in the drawing represents a vessel, made of wood or other suitable material, of suitable form and size. In it may be suspended a bag, C, which contains protosulphate of iron, sulphuret of potash, or other suitable ingredients for precipitating the gold, silver, &c., contained in the solution. Such ingredients might, however, be dissolved and poured into said vessel from day to day, and would have the same effect; but this would require care on the part of the operator, for which reason I prefer suspending the chemicals or metals used as precipitating ingredients in such a way that they will be brought in contact with the waste solutions, from which the gold, silver, &c., are to be precipitated, as often as the vessel fills, and thereby become dissolved as fast as required for the purpose, without taxing the watchfulness and care of the operator.

In place of the chemicals mentioned, sheet-zinc, copper, or other suitable precipitating ingredients may be used, according to the nature of the solution from which the gold, silver, &c., are to be precipitated.

The process is very simple. The waste solution is conducted or poured into the vessel A, and is then brought in contact or mingled with the precipitating ingredients, whereby the silver, gold, &c., are precipitated and separated from the worthless liquid. When the precipitated metals have settled, the liquid can be drawn off through a suitable pipe, E, arranged on any suitable part of the vessel A, or may be allowed to flow over the top edge of said vessel.

Where more water is to be used during the day than the vessel A is capable of holding, a vertical partition, B, may be arranged in the vessel A, to cause a double passage of the liquid, and to prevent a current from being formed while it passes off through the pipe E or its equivalent.

On the pipe E may be arranged a box, D, containing sponge or other suitable filtering device, for arresting any particles of metal that may be carried along in the liquid.

Where it is practicable to have the vessel large enough to hold all of the waste solutions for a day or two, so that the silver and gold can have ample time to settle after precipitation has taken place, the partition, filterer, and overflow-pipe may be dispensed with, and in their stead a faucet may be inserted near the bottom of the vessel A, and the worthless liquid drawn off every morning before commencing work for the day, or as often as the vessel fills and precipitation has taken place and the valuable metals have had time to settle.

The same apparatus may be used for recovering gold, silver, and other metals or valuable ingredients from the washings of photographs, and for other equivalent purposes.

Having thus described my invention, I claim as new and desire to secure by Letters Patent—

The use of the means herein described for recovering gold and silver from spent photographic solutions and washings, substantially as set forth.

JEHYLEMAN SHAW.

Witnesses:

A. E. BEACH,

T. B. MOSHER.